(12) United States Patent
Watazu et al.

(10) Patent No.: US 9,063,628 B2
(45) Date of Patent: Jun. 23, 2015

(54) CAPACITANCE-TYPE TOUCH SENSOR AND DISPLAY DEVICE EQUIPPED THEREWITH

(71) Applicant: NISSHA PRINTING CO., LTD., Kyoto (JP)

(72) Inventors: Yuji Watazu, Kyoto (JP); Kazuhiko Takahata, Kyoto (JP); Ryomei Omote, Kyoto (JP); Kazuhiro Nishikawa, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/346,136

(22) PCT Filed: Sep. 19, 2012

(86) PCT No.: PCT/JP2012/073880
§ 371 (c)(1),
(2) Date: Mar. 20, 2014

(87) PCT Pub. No.: WO2013/042674
PCT Pub. Date: Mar. 28, 2013

(65) Prior Publication Data
US 2014/0240622 A1   Aug. 28, 2014

(30) Foreign Application Priority Data
Sep. 21, 2011   (JP) .................. 2011-206417

(51) Int. Cl.
*G09G 5/00* (2006.01)
*G06F 3/044* (2006.01)
*B32B 3/14* (2006.01)

(52) U.S. Cl.
CPC .. *G06F 3/044* (2013.01); *B32B 3/14* (2013.01)

(58) Field of Classification Search
CPC ....... G06F 3/044; G06F 3/0488; G06F 3/016; G06F 3/03541

USPC .................... 345/173–178; 178/18.01–18.06
See application file for complete search history.

(56) References Cited

U.S. PATENT DOCUMENTS 5,817,383 A   10/1998 Takase et al.
8,816,970 B2 *   8/2014 Wang et al. ................... 345/173
(Continued)

FOREIGN PATENT DOCUMENTS

CN   1141086 A   1/1997
CN   101490130   7/2009
(Continued)

OTHER PUBLICATIONS

International Search Report issued Dec. 25, 2012 in International (PCT) Application No. PCT/JP2012/073880.
(Continued)

*Primary Examiner* — Jennifer Nguyen
(74) *Attorney, Agent, or Firm* — Wenderoth, Lind & Ponack, L.L.P.

(57) ABSTRACT

A capacitance-type touch sensor and a display device equipped with this sensor are provided in which the detection of the transparent conductive portions can be suppressed without employing a technique using a dummy electrode. The capacitance-type touch sensor of the present invention includes a resin sheet and a plurality of transparent conductive portions formed in parallel on the resin sheet. In this capacitance-type touch sensor, the difference between the maximum and minimum retardation values of a resin sheet equipped with transparent conductive portions is 3 nm or less.

18 Claims, 13 Drawing Sheets

(56) References Cited

U.S. PATENT DOCUMENTS

| | | |
|---|---|---|
| 2004/0239641 A1* | 12/2004 | Takahata et al. ............ 345/173 |
| 2009/0227756 A1* | 9/2009 | Hino et al. .................. 526/351 |
| 2010/0196720 A1 | 8/2010 | Kato et al. |
| 2010/0231544 A1* | 9/2010 | Lu et al. ..................... 345/173 |
| 2010/0265210 A1* | 10/2010 | Nakanishi et al. .......... 345/174 |

FOREIGN PATENT DOCUMENTS

| | | |
|---|---|---|
| JP | 62-247330 | 10/1987 |
| JP | 5-61606 | 3/1993 |
| JP | 5-189151 | 7/1993 |
| JP | 5-224818 | 9/1993 |
| JP | 2009-226932 | 10/2009 |
| TW | 384394 | 7/2010 |

OTHER PUBLICATIONS

Chinese Office Action issued Sep. 12, 2014 in corresponding Chinese Patent Application No. 201280045814.6, with English translation.
Office Action issued Feb. 28, 2015 in Chinese Application No. 201280045814.6, with English language translation.

* cited by examiner

Fig.5
(a)
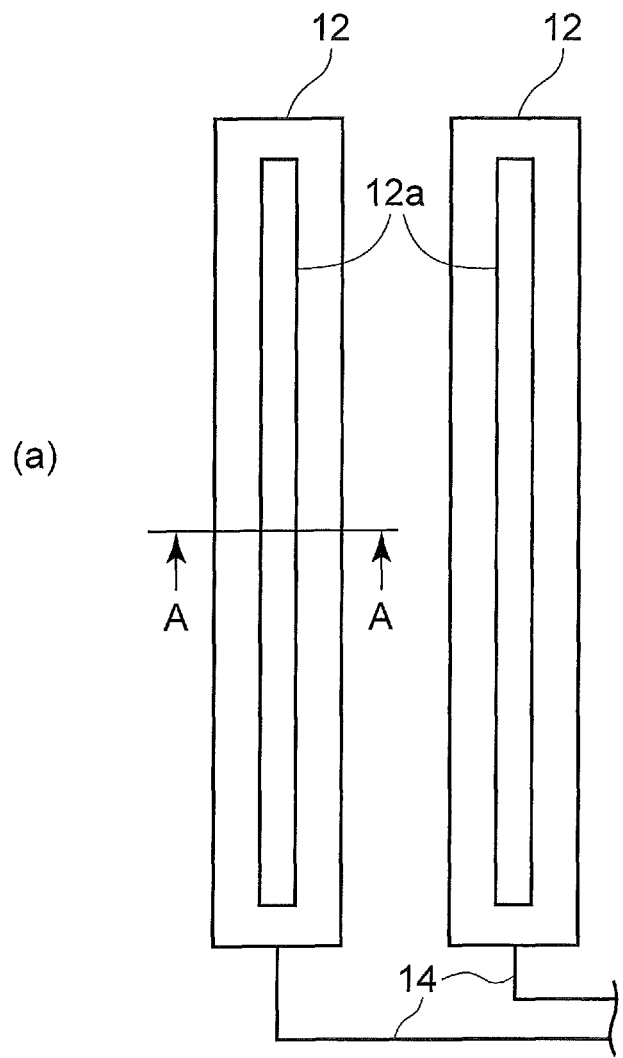
(b)
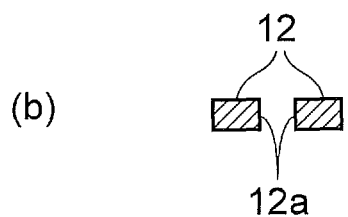

CAPACITANCE-TYPE TOUCH SENSOR AND DISPLAY DEVICE EQUIPPED THEREWITH

TECHNICAL FIELD

The present invention relates to a touch sensor that can be applied to an input device such as a mobile phone, a PDA, a small PC, or the like, in which a video screen such as a liquid crystal panel is provided, and relates to a display device equipped therewith.

BACKGROUND ART

In recent years, the application of a liquid crystal display device (LCD), an organic light emitting device (OLED), and the like has expanded, and the LCD or the like is used also in various types of displays used outdoors.

For example, the LCD or the like is widely used in an instrument panel of a vehicle, a ship, an airplane, or the like, an on-vehicle car navigation system, a digital camera, a mobile apparatus such as a mobile phone or a personal computer, digital signage used in, for example, a building or a supermarket, or the like. In such an electronic apparatus, a touch panel which serves as a display and input means is widely used.

As types of touch panels, those of an optical type, an ultrasonic type, an electromagnetic induction type, a resistive film type, or a capacitance type are generally used. However, for a combination with a small liquid crystal display, a resistive film type touch panel is often used. The resistive film type touch panel is an input switch using a transparent conductive film as a conductor, and is structured such that two transparent conductive films face each other via a spacer. A pressure made by a stylus or a finger brings the electrode faces into contact with each other to cause conduction, whereby position detection can be performed.

In contrast, a capacitance type touch panel allows detection of multiple points, so-called multi-touch, which cannot be realized by an ordinary resistive film type touch panel, and thus, the capacitance type touch panel has been attracting attention in recent years. With respect to the above-described transparent conductive film, a transparent conductive film is formed on a base material, to be subjected to annealing treatment (heat treatment) at a predetermined temperature (for example, about 150° C.) in order to obtain durability, whereby the transparent conductive film is crystallized.

However, in a conventional capacitance type touch panel, transparency differs between a portion where a transparent electrode is present and a portion where a transparent electrode is not present, and thus, difference in brightness or tint on the display screen is caused. Accordingly, a user can recognize the presence of the transparent electrode, which is a problem in terms of appearance and displaying quality of the display. As a technique for improving this problem to some extent, a method has also been taken in which the gap between adjacent transparent electrodes in the vertical direction or in the horizontal direction is narrowed to make the transparency of the screen come close to a constant level. However, in such a touch panel, there occurs another problem that, due to the narrow gap between adjacent transparent electrodes in the vertical direction or in the horizontal direction, when a peripheral portion of a key is touched, a key adjacent thereto is erroneously input.

In order to solve this problem, for example, Patent Literature 1 discloses an erroneous input preventing touch panel. In this erroneous input preventing touch panel, the gap between a vertical transparent electrode 2 and a dummy electrode 4 is set to be not greater than about 0.6 mm. Consequently, transparency comes close to a constant level.

Patent Literature 2 discloses a touch panel device. In this touch panel device, the intervals between vertical transparent electrodes $2a$ to $2n$ and dummy electrode arrays $4a$ to $4n$, are narrow, and each of the dummy electrode arrays $4a$ to $4n$ is present in the gap delimited by electrodes adjacent thereto, and thus, transmittance comes close to a constant level.

CITATION LIST

Patent Literature

Patent Literature 1: Japanese Laid-Open Patent Publication H05-189151
Patent Literature 2: Japanese Laid-Open Patent Publication H05-224818

SUMMARY OF THE INVENTION

Problems to be Solved by the Invention

However, as described in Patent Literature 1 or 2, according to the method in which dummy electrodes are arranged, due to the presence of the dummy electrodes, the light transmittance in that area decreases accordingly, and the brightness of the entirety of the display screen decreases.

Therefore, an object of the present invention is to provide a capacitance type touch sensor that can suppress recognition of transparent conductive parts while maintaining brightness of the entirety of the display screen without employing a technique using dummy electrodes, and to provide a display device equipped therewith.

Solution to the Problems

In order to achieve the above object, the present inventors started to clarify what mechanism causes such recognition of the transparent conductive parts in the first place. For example, the light transmittance of an indium tin oxide (ITO) transparent electrode is 90% (in a case where the thickness of the transparent electrode is 20 nm), which is not at all low. Thus, the present inventors doubted the conventional idea that the light transmittance causes recognition of the transparent electrode.

Further, although a surface of a transparent electrode has a relatively high reflectance, in a case where a polarizing plate or a circularly polarizing plate is arranged to the user side in a touch sensor, reflected light from the surface of the transparent electrode is reduced to some extent. In view of these, the present inventors came to think that the recognition of the transparent electrode, which is actually observed in a conventional touch sensor, may be brought by some other cause other than the light transmittance of the transparent electrode. If the conventional understanding of the problem regarding the cause of the recognition of the transparent electrode is wrong, appropriate solution means cannot be taken. Therefore, in order to further advance the analysis, the present inventors repeatedly performed experimental steps of forming a resin sheet being a major component of a capacitance type touch sensor, and of forming transparent conductive parts on the resin sheet, to confirm the recognition state of the transparent electrode. It should be noted that a capacitance type touch sensor is usually formed by: forming a conductive metal oxide film such as ITO or the like on a resin sheet, and then crystallizing the conductive metal oxide film through annealing treatment. While repeating the experiment of subjecting the transparent conductive parts to annealing treatment, the present inventors have found that the observed recognition states of the transparent electrode greatly differ before and after the annealing treatment.

Then, as shown below, the present inventors examined retardation values of the resin sheet before and after the annealing treatment. That is, retardation in a presence region of a transparent conductive part and retardation in a non-presence region of a transparent conductive part before annealing treatment were measured, and retardation in the presence region of the transparent conductive part and retardation in the non-presence region of the transparent conductive part after the annealing treatment were measured. The material of the resin sheet was polycarbonate (PC), and the measurement wavelength was 550 nm. FIG. 13 shows the retardation values measured in this experiment. In FIG. 13, change of retardation in the presence region of a transparent conductive part 12 before and after annealing treatment is indicated by a line L1, and change of retardation in the non-presence region of the transparent conductive part 12 before and after the annealing treatment is indicated by a line L2. With reference to FIG. 13, it was found that the difference in retardation values on a surface of the resin sheet was greater after the annealing treatment than before the annealing treatment.

Thus, the present inventors have found the following. When transparent conductive parts are crystallized through annealing treatment, stress distribution occurs in the resin sheet due to expansion/shrinkage of the transparent conductive parts. Accordingly, the refractive index or the reflectance of the resin sheet changes, thereby causing a difference in retardation in the resin sheet. This difference causes the recognition of the transparent electrodes.

The present invention provides a capacitance type touch sensor in which the difference in retardation in a resin sheet is suppressed, and in more detail, to provide a capacitance type touch sensor in which various techniques for reducing retardation are employed.

A capacitance type touch sensor including a resin sheet and a plurality of transparent conductive parts formed in parallel to each other on the resin sheet, wherein a difference between a maximum value and a minimum value of a retardation value of the resin sheet including the transparent conductive parts is not greater than 3 nm.

Further, each transparent conductive part is formed by an evaporation method, a sputtering method, an ion plating method, or a plating method, and when the value of the thickness of the transparent conductive part/the thickness of the resin sheet) is not less than 0.000016 and not greater than 0.02, stress in the resin sheet can be reduced. Accordingly, the difference in retardation can be further suppressed.

Alternatively, each transparent conductive part is formed from a dried coating film, and when the value of (the thickness of the transparent conductive part/the thickness of the resin sheet) is less than 5, stress in the resin sheet can be reduced. Accordingly, the difference in retardation can be further suppressed.

The transparent conductive parts are formed in a stripe shape on at least one face of the resin sheet, and when the value of (the width of a non-presence region of the transparent conductive part/the width of a presence region of the transparent conductive part) on the one face is not less than 3 and not greater than 10, stress in the resin sheet can be reduced. Accordingly, the difference in retardation can be further suppressed.

When a stress relaxation layer is formed between the resin sheet and each transparent conductive part, stress in the resin sheet can be further reduced.

When a slit is formed in a portion of each transparent conductive part, stress in the resin sheet can be further reduced. The slit may pass through the transparent conductive part in the thickness direction of the transparent conductive part.

When each transparent conductive part is a transparent conductive part annealed at a temperature not higher than 145° C., stress in the resin sheet can be further reduced.

Preferably, the resin sheet has a glass transition temperature of not lower than 100° C.

When the resin sheet has a photoelastic coefficient of not greater than $30 \times 10^{-8}$ $cm^2/N$, birefringence is reduced. Accordingly, the difference in retardation can be further suppressed.

When a stress relaxation part is formed in a non-presence region of the transparent conductive part on the resin sheet, the stress relaxation part being formed from a material different from a material of the transparent conductive part, stress in the resin sheet can be reduced. The material different from the material of the transparent conductive part may be a material identical to the material of the resin sheet.

When the capacitance type touch sensor further includes a polarizing plate and a phase difference plate, reflection on a surface of the capacitance type touch sensor can be prevented, and visibility can be further improved.

A display device according to the present invention has a display panel to which the above capacitance type touch sensor is mounted.

Advantageous Effects of the Invention

In the present invention, the difference between a maximum value and a minimum value of a retardation value in the resin sheet is suppressed to not greater than 3 nm. Accordingly, recognition of the transparent conductive parts can be suppressed, and a capacitance type touch sensor excellent in terms of appearance can be provided.

BRIEF DESCRIPTION OF THE DRAWINGS

In FIG. 5, (a) is a top view showing a structure of a transparent conductive part according to a first embodiment, and (b) is a cross-sectional view of (a) of FIG. 5, taken along an A-A line.

DESCRIPTION OF EMBODIMENTS

Hereinafter, a capacitance type touch sensor according to embodiments of the present invention will be described with reference to the drawings.

1. First Embodiment 1-1. Overall Structure of Capacitance Type Touch Sensor

Figure 1:
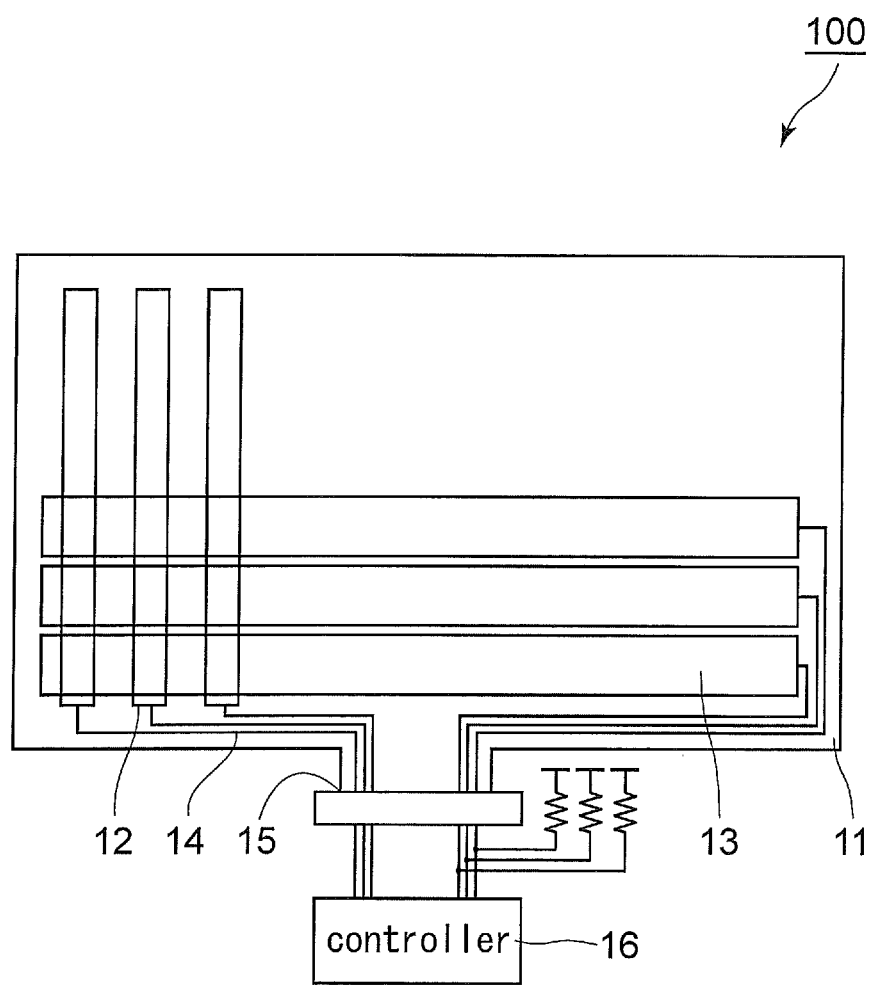
FIG. 1 is a plan view showing a basic structure of a capacitance type touch sensor according to the present embodiment.

FIG. 1 is a plan view showing a basic structure of a capacitance type touch sensor 100 according to the present embodiment.

As shown in FIG. 1, the capacitance type touch sensor 100 according to the present embodiment mainly includes: a resin sheet 11 formed from, for example, polycarbonate; transparent conductive parts 12 which are formed from, for example, ITO (indium tin oxide) and detect key inputs in the vertical direction; transparent conductive parts 13 which are formed from, for example, ITO, detect key inputs in the horizontal direction, and are insulated from the transparent conductive parts 12; a connector part 15; and lead electrodes 14 which connect each of the transparent conductive parts 12 and 13 to the connector part 15. The connector part 15 is connected to a controller 16, and the capacitance type touch sensor 100 is controlled by the controller 16.

1-2. Cross-Sectional Structure of Display Device Including Capacitance Type Touch Sensor FIG. 2 is a cross-sectional view showing a structure of a display device 200 including the capacitance type touch sensor 100 according to the present embodiment.

Figure 2:
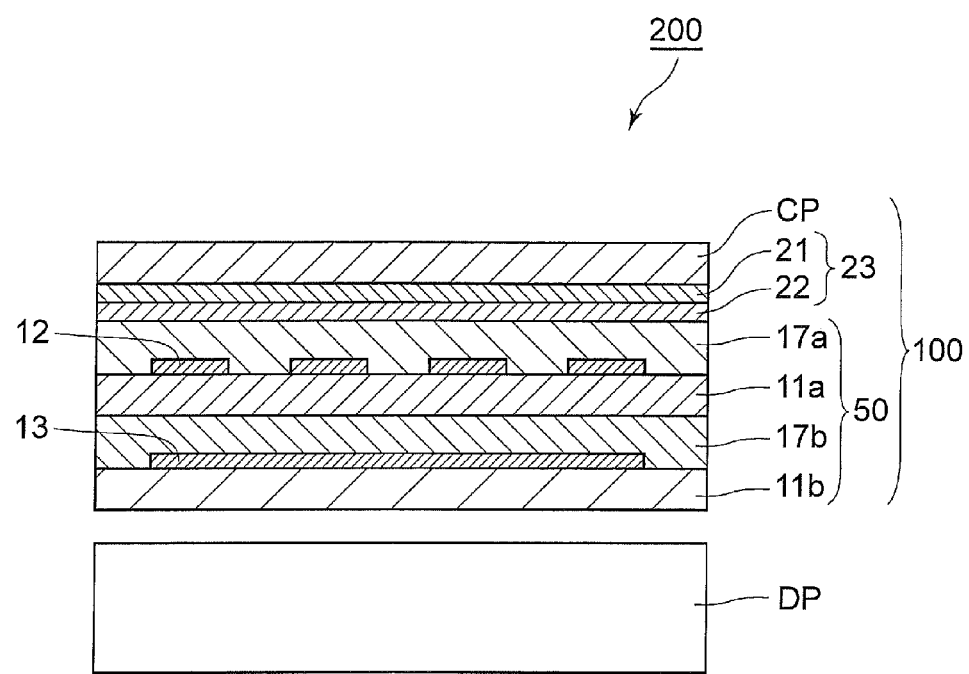
FIG. 2 is a cross-sectional view showing a structure of a display device including the capacitance type touch sensor according to the present embodiment.

As shown in FIG. 2, the display device 200 includes the capacitance type touch sensor 100 and a display DP as a display panel provided below the capacitance type touch sensor 100 with an interval therebetween.

The capacitance type touch sensor 100 has a laminated structure composed of a transparent cover panel CP, a circularly polarizing plate 23, and a sensor sheet 50.

The cover panel CP may be formed from glass, for example. The circularly polarizing plate 23 is provided so as to prevent reflection at the surface of the capacitance type touch sensor 100 and to improve visibility, and is formed in a laminated structure composed of a polarizing plate 21 and a phase difference plate 22.

The sensor sheet 50 includes a resin sheet 11a, the transparent conductive parts 12 formed on the resin sheet 11a, and an adhesive layer 17a which bonds the phase difference plate 22 and the resin sheet 11a together, as well as a resin sheet 11b, the transparent conductive parts 13 formed on the resin sheet 11b, and an adhesive layer 17b which bonds the resin sheet 11a and the resin sheet 11b together. In the following, the resin sheet 11a and the resin sheet 11b may be collectively referred to as a resin sheet 11.

The display DP is composed of a display element such as a liquid crystal display (LCD), an organic EL display (OLED), or the like.

1-3. Resin Sheet 11

In the present invention, the thickness of the resin sheet 11 is preferably 10 to 300 μm. By using the resin sheet 11 having a small photoelastic coefficient, birefringence in the resin sheet 11 can be reduced, and thus, the difference in retardation of the resin sheet 11 can be suppressed. As the resin sheet 11, it is desirable to use a resin sheet whose photoelastic coefficient is preferably not greater than $30 \times 10^{-8}$ cm$^2$/N, more preferably not greater than $20 \times 10^{-8}$ cm$^2$/N, and still more preferably not greater than $10 \times 10^{-8}$ cm$^2$/N.

As an example of a material having a small photoelastic coefficient, a cycloolefin polymer (COP) having a photoelastic coefficient of $5 \times 10^{-8}$ cm$^2$/N, ARTON (registered trademark), or a triacetyl cellulose (TAC) having a photoelastic coefficient of $12 \times 10^{-8}$ cm$^2$/N can be used. In particular, the COP is advantageous in that it has a small birefringence, hardly absorbs moisture even in high temperature and high humidity environment, is excellent in heat resistance, and hardly changes in dimensions due to heat.

1-4. Recognition of Transparent Conductive Part Due to Difference in Retardation FIG. 3 and FIG. 4 illustrate how the transparent conductive parts 12 are recognized due to the difference between retardation in a presence region of a transparent conductive part 12 and retardation in a non-presence region of a transparent conductive part 12.

As described above, when transparent conductive parts are crystallized through annealing treatment, stress occurs in the resin sheet due to shrinkage of the transparent conductive parts, thereby causing a difference in retardation on the resin sheet.

Figure 3:
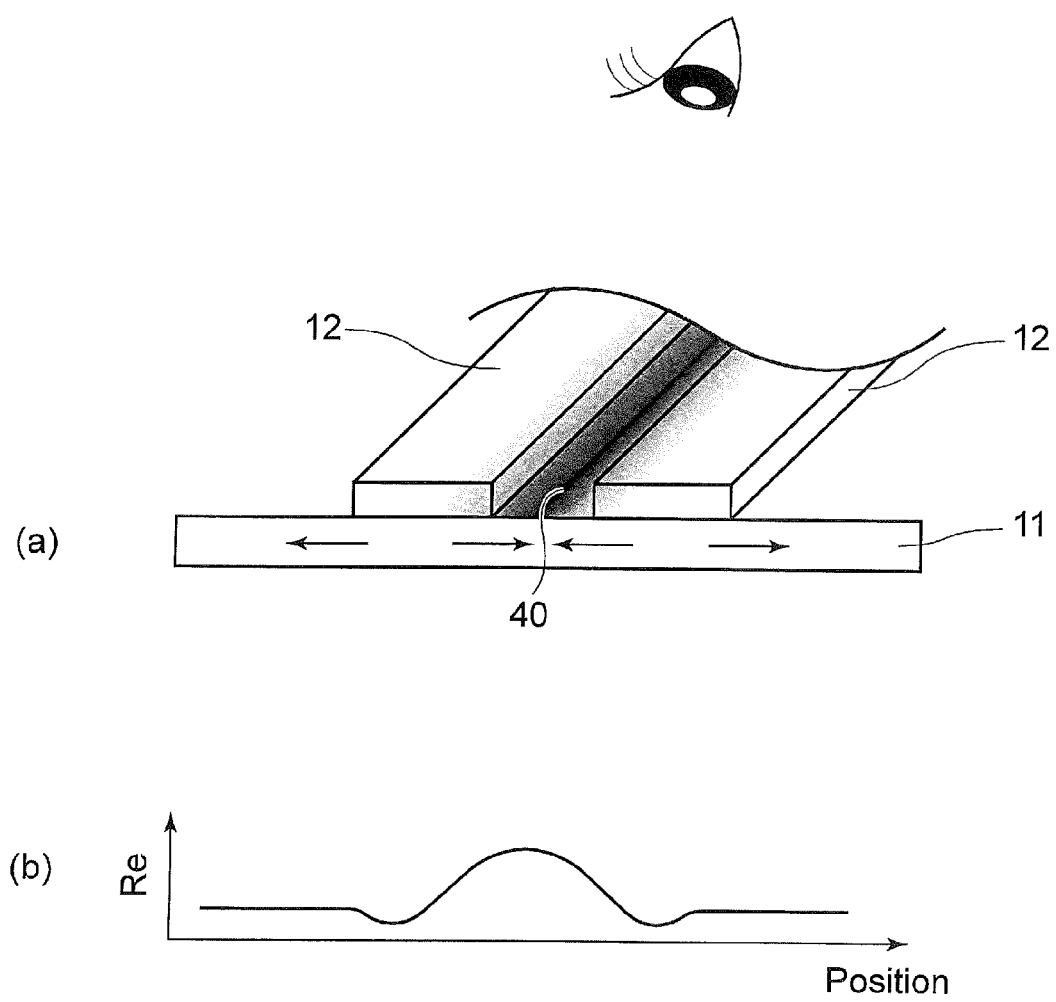
In FIG. 3, (a) is a perspective view showing how the transparent electrodes are recognized due to the difference in retardation, and (b) is a graph showing the relation between retardation and the position of the transparent electrodes.

For example, as shown by the arrows in (a) of FIG. 3, when the transparent conductive parts 12 are to expand, tensile stress is concentrated in a portion 40 of the resin sheet 11 in the region sandwiched by one transparent conductive part 12 and another transparent conductive part 12, and this portion 40 tends to shrink. As a result, a birefringence state in the portion 40 changes, and gradation in brightness as shown in (a) of FIG. 3 is caught by the eyes of a person. That is, the presence of the transparent conductive parts 12 is recognized. It should be noted that the position in the horizontal axis in (b) of FIG. 3 corresponds to the position in the width direction of the resin sheet 11 in (a) of FIG. 3, and (b) of FIG. 3 shows change in retardation in accordance with the position.

Figure 4:
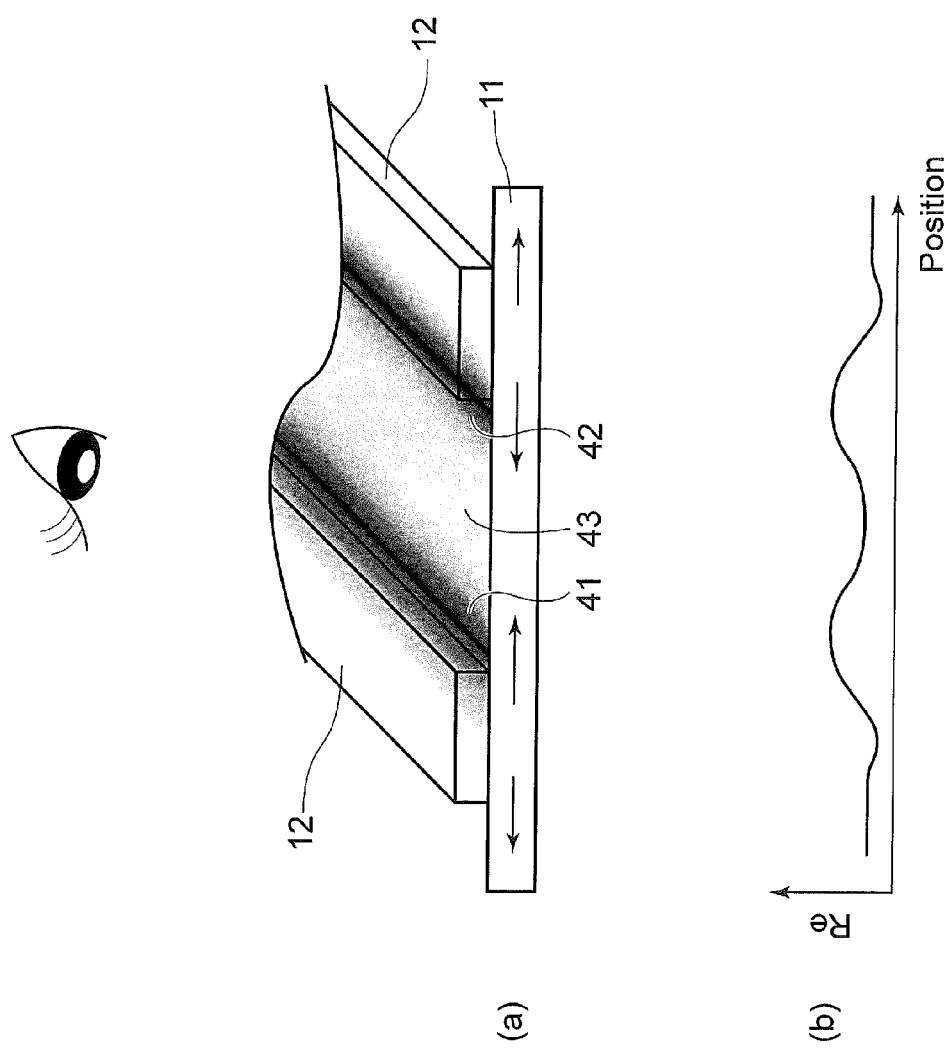
In FIG. 4, (a) is a perspective view showing how the transparent electrodes are recognized due to the difference in retardation, and (b) is a graph showing the relation between retardation and the position of the transparent electrodes.

Further, as shown in (a) of FIG. 4, in a case where an interval between adjacent transparent conductive parts 12 is greater than that in (a) of FIG. 3, among portions 41, 42, and 43 of the resin sheet 11 in the region sandwiched by the left transparent conductive part 12 and the right transparent conductive part 12, the portions 41 and 42 are subjected to stress due to expansion of the transparent conductive parts 12. On the other hand, the portion 43 is relatively less likely to be subjected to influence due to the expansion of the transparent conductive parts 12. As a result, gradation as shown in (a) of FIG. 4 is caught by the eyes of a person. It should be noted that the position in the horizontal axis of (b) of FIG. 4 corresponds to the position in the width direction of the resin sheet 11 in (a) of FIG. 4, and (b) of FIG. 4 shows change in retardation in accordance with the position.

Retardation is a phase difference between two light waves caused by a phenomenon in which light incident on a crystal or another anisotropic material is split into two light waves having vibration directions perpendicular to each other. When unpolarized light is incident on a birefringent material, the incident light is split into two light waves. Vibration directions of the two light waves are perpendicular to each other, and one of them is referred to as vertically polarized light and the other is referred to as horizontally polarized light. The vertically polarized light becomes an extraordinary ray, and the horizontally polarized light becomes an ordinary ray. The ordinary ray is a ray whose propagation velocity does not depend on the propagation direction thereof, and the extraordinary ray is a ray whose velocity depends on the propagation direction thereof. In a birefringent material, a direction in which the velocities of these two rays coincide with each other exists, and this is called as an optical axis. A retardation value Δnd is represented by (nx−ny)d. Here, d is the thickness of a sample and nx and ny are refractive indices of the sample.

The above is a general definition of retardation. However, it is assumed that retardation in the present invention refers to a retardation value measured under the following conditions (1) to (3).

(1) In the case of a capacitance type touch sensor having two or more resin sheets 11, measurement is performed in a state where the resin sheets 11 (the resin sheet 11a and the resin sheet 11b in the case of FIG. 2) are included.

(2) A maximum value and a minimum value of the retardation value need not be measured for the entire area of the resin sheet 11. It is sufficient to measure a maximum value and a minimum value in a section that spans at least three adjacent transparent conductive parts.

(3) Measurement is performed in a state where the transparent conductive parts are formed on the resin sheet.

1-5. Structure of Transparent Conductive Part

As described above, the present invention is a capacitance type touch sensor including: the resin sheet 11; and a plurality of the transparent conductive parts 12 formed in parallel to each other on the resin sheet 11, and the capacitance type touch sensor satisfies that the difference between a maximum value and a minimum value of the retardation value of the resin sheet 11 including the transparent conductive parts 12 is not greater than 3 nm. Accordingly, recognition of the transparent conductive parts 12 can be suppressed. Moreover, by devising the shape of the transparent conductive parts 12 as described below, the difference in retardation can be further suppressed.

FIG. 5 shows a structure of the transparent conductive part 12 according to the present embodiment.

As shown in (a) of FIG. 5, a slit 12a which has a long shape is formed in each transparent conductive part 12 along the length direction thereof.

As shown in (b) of FIG. 5, the slit 12a may pass through the transparent conductive part 12 in the thickness direction of the transparent conductive part 12. Although in (b) of FIG. 5, an example in which the entirety of the slit 12a passes through the transparent conductive part 12 in the thickness direction of the transparent conductive part 12 has been described, the present invention is not limited thereto. A structure in which a portion of the slit 12a passes through the transparent conductive part 12 in the thickness direction of the transparent conductive part 12 may be employed.

By forming the slit 12a in the transparent conductive part 12, compared with a case where the slit 12a is not provided in the transparent conductive part 12, expanding/shrinking force caused by the transparent conductive part 12 after annealing treatment can be dispersed and the difference between a maximum value and a minimum value of retardation can be suppressed to not greater than 3 nm. Accordingly, recognition of the transparent conductive part 12 can be suppressed.

As a material for the transparent conductive part 12, a layer formed from a metal oxide such as indium tin oxide (ITO) or indium zinc oxide (IZO) can be used, and can be formed by a vacuum evaporation method, a sputtering method, an ion plating method, a plating method, or the like.

Moreover, the transparent conductive film 12 may be formed as a layer of a dried coating of a transparent conductive polymer such as PEDOT (poly(3,4-ethylenedioxythiophene)) or a transparent conductive ink containing carbon nanotube or silver nanofiber in a binder. For patterning of transparent conductive film 12, a method of wet etching or dry etching can be used.

Preferably, the thickness of the transparent conductive film 12 when formed by the above evaporation method or the like is about 5 to 200 nm. Desirably, the transparent conductive film 12 has a light transmittance of not lower than 80%, preferably not lower than 85%, and a surface resistance value of 100Ω to 400Ω.

The thickness of the transparent conductive part 12 when formed from a dried coating of PEDOT or the like is preferably less than 50 μm.

In order to suppress the difference in retardation, it is desirable that the above annealing treatment of the transparent conductive part 12 is performed at a low temperature of preferably not higher than 145° C., more preferably not higher than 135° C., and still more preferably not higher than 125° C.

1-6. Other Structure of Sensor Sheet

Figure 6:
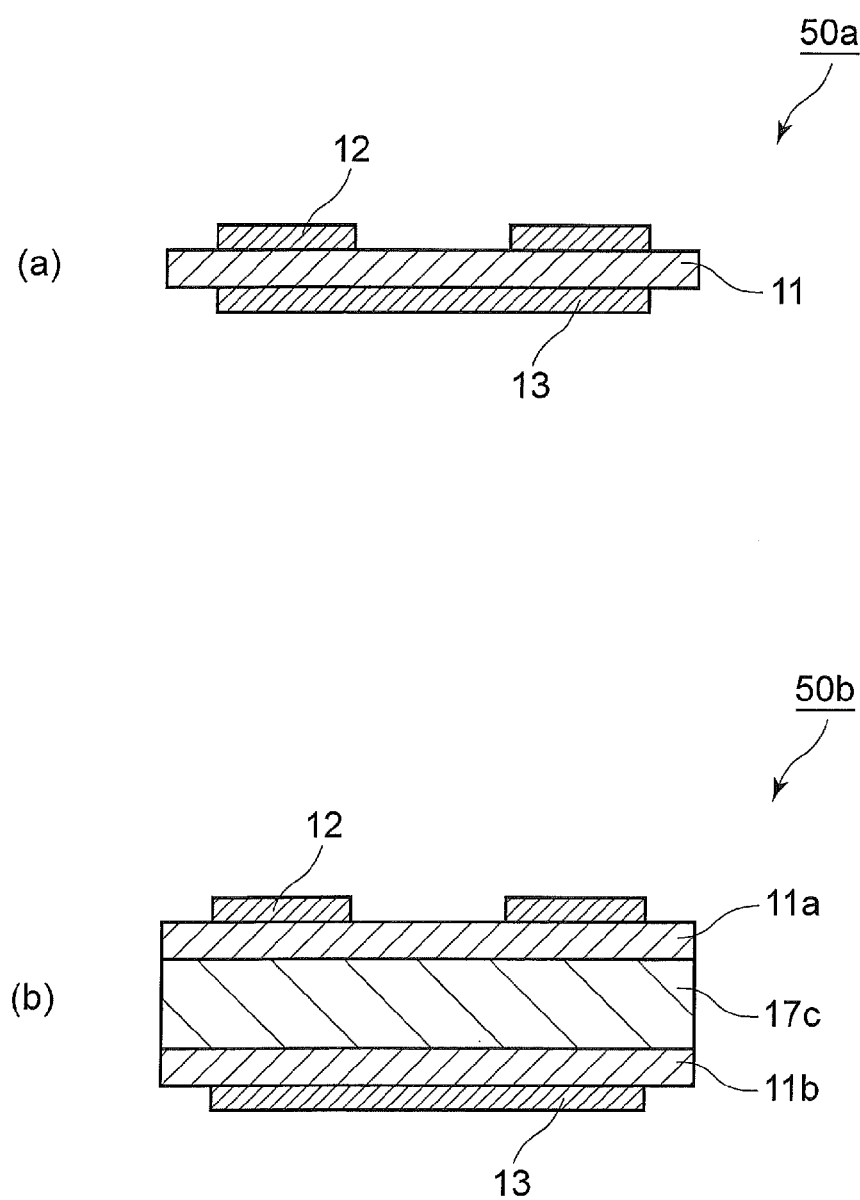
In FIG. 6, (a) and (b) are cross-sectional views showing other structures of a sensor sheet shown in FIG. 2.

FIG. 6 shows cross-sectional views of other structures of the sensor sheet 50 shown in FIG. 2.

As another example of the sensor sheet applicable to the present invention, as shown in (a) of FIG. 6, a sensor sheet 50a may be used in which the transparent conductive parts 12 are formed on one face of one resin sheet 11 and the transparent conductive parts 13 are formed on the other face of the resin sheet 11.

As still another example of the sensor sheet applicable to the present invention, as shown in (b) of FIG. 6, a sensor sheet 50b may be used in which the resin sheet 11a having the transparent conductive parts 12 formed on one face of the resin sheet 11a, and the resin sheet 11b having the transparent conductive parts 13 formed on the other face of the resin sheet 11b, the other face being on the opposite side of the one face above, are laminated via an adhesive layer 17c.

1-7. Relation Between Resin Sheet and Transparent Conductive Part

Figure 7:
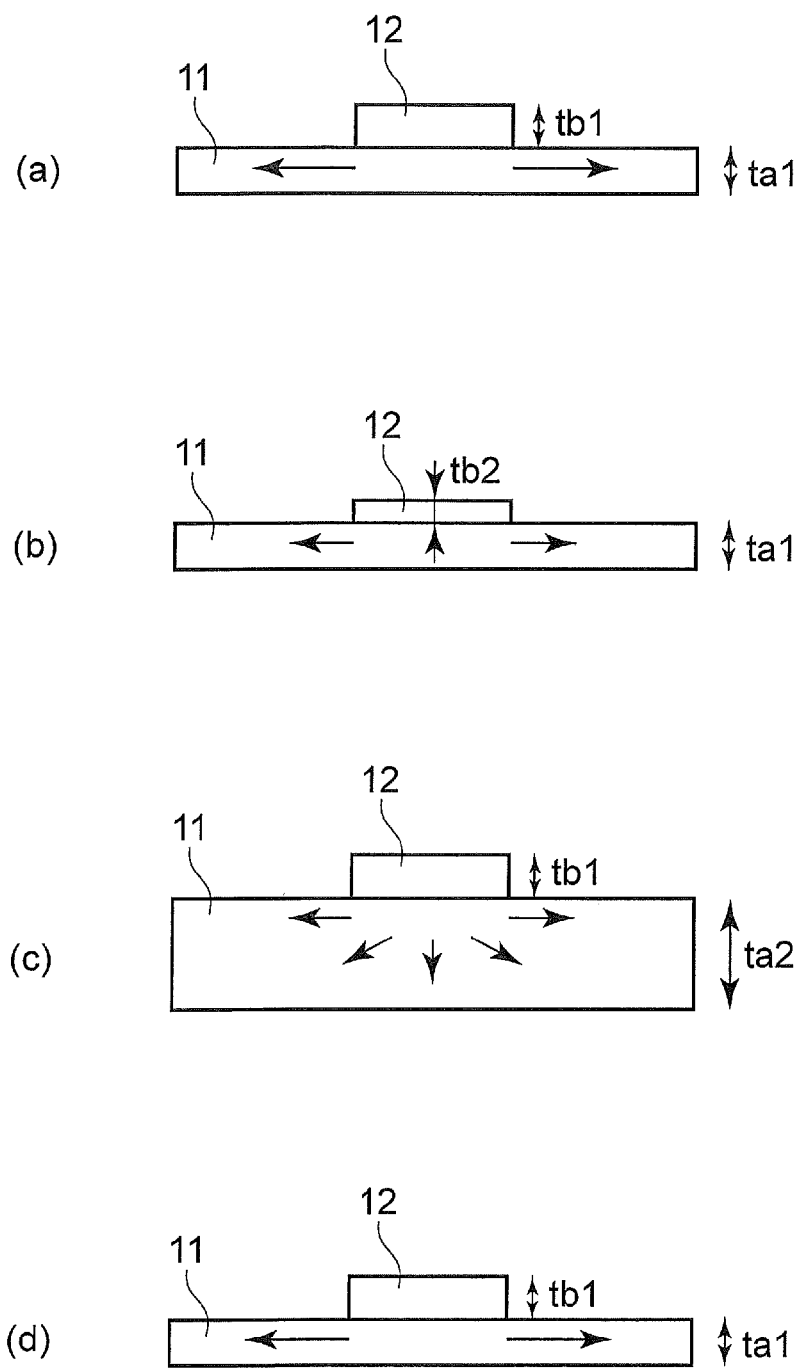
In FIG. 7, (a) to (d) illustrate the relation between the thickness of a resin sheet and the thickness of a transparent conductive part, the relation having influence on retardation.

FIG. 7 illustrates the relation between the thickness of the resin sheet 11 and the thickness of the transparent conductive part 12.

Compared with a case where the thickness of the resin sheet 11 is ta1 and the thickness of the transparent conductive part 12 is tb1 (see (a) of FIG. 7), in a case where the thickness of the resin sheet 11 is also ta1 and the thickness of the transparent conductive part 12 is tb2 (<tb1) (see (b) of FIG. 7), tensile stress applied on the resin sheet 11 due to expansion/shrinkage of the transparent conductive part 12 is reduced (viewpoint 1).

Compared with a case where the thickness of the resin sheet 11 is ta2 (>ta1) and the thickness of the transparent conductive part 12 is tb1 (see (c) of FIG. 7), in a case where the thickness of the resin sheet 11 is ta1 and the thickness of the transparent conductive part 12 is also tb1 (see (d) of FIG. 7), tensile stress applied to the resin sheet 11 due to expansion/shrinkage of the transparent conductive part 12 is increased (viewpoint 2).

From the viewpoints 1 and 2 above, it can be said that the smaller the value of (the thickness of the transparent conductive part 12/the thickness of the resin sheet 11) is, the less tensile stress becomes.

Therefore, in the present invention, in a case where the transparent conductive part 12 is formed as a monolayer by an evaporation method, a sputtering method, an ion plating method, or a plating method, the value of (the thickness of the transparent conductive part 12/the thickness of the resin sheet 11) is desirably not less than 0.000016 and not greater than 0.02. Moreover, in a case where the transparent conductive part 12 is formed from a dried monolayer coating film, the value of (the thickness of the transparent conductive part 12/the thickness of the resin sheet 11) is desirably less than 5.

Moreover, the value of (the width of a non-presence region of the transparent conductive part 12/the width of a presence region of the transparent conductive part 12) is preferably not less than 3 and not greater than 10. These values are desirable based on a consideration that when the transparent conductive parts 12 are within a certain distance from each other, a non-presence region of the transparent conductive part 12 receives stress from both of its adjacent transparent conductive parts, and thus the degree of retardation is also increased.

It should be noted that the capacitance type touch sensor of the present invention can be applied to both of a self capacitance detection type and a mutual capacitance detection type.

2. Second Embodiment

Hereinafter, a second embodiment of the present invention will be described. The same components as those of the first embodiment are denoted by the same reference characters, and the description thereof will be omitted.

Figure 8:
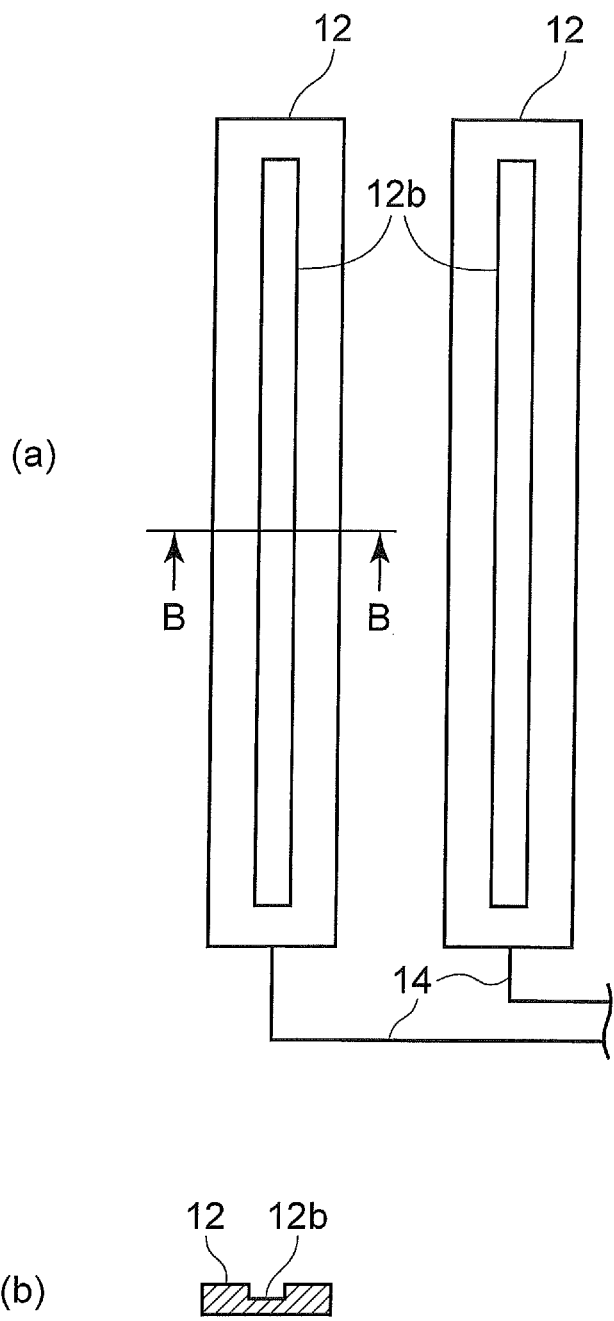
In FIG. 8, (a) is a top view showing a structure of the transparent conductive part according to a second embodiment, and (b) is a cross-sectional view of (a) of FIG. 8, taken along a B-B line.

FIG. 8 shows a structure of the transparent conductive part 12 according to the present embodiment.

As shown in (a) of FIG. 8, a slit 12b which has a long shape is formed in each transparent conductive part 12 along the length direction thereof. It should be noted that the slit 12b does not pass through the transparent conductive part 12 in the thickness direction of the transparent conductive part 12, as shown in (b) of FIG. 8.

By forming the slit 12b in the transparent conductive part 12 in this manner, compared with a case where the slit 12b is not provided in the transparent conductive part 12, expanding/shrinking force in the entirety of the transparent conductive parts 12 after annealing treatment can be reduced. Accordingly, tensile stress occurring in the resin sheet 11 can be reduced, and the difference in retardation of the resin sheet 11 can be suppressed to not greater than 3 nm.

3. Third Embodiment

Figure 9:
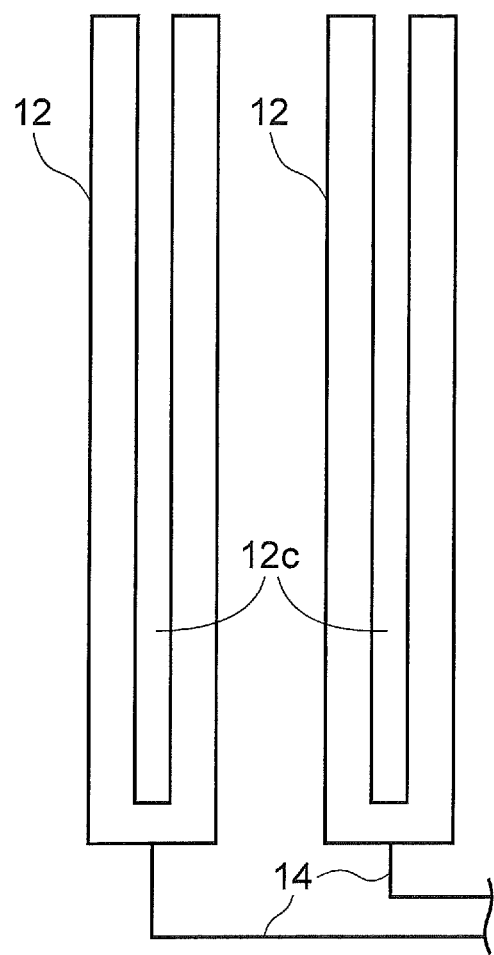
FIG. 9 is a top view showing a structure of the transparent conductive part according to a third embodiment.

FIG. 9 shows a structure of the transparent conductive part 12 according to the present embodiment.

As shown in FIG. 9, a slit 12c which has a long shape is formed in each transparent conductive part 12 along the length direction thereof. The slit 12c is formed such that the transparent conductive part 12 has a partially disconnected portion (upper portion of FIG. 9).

By forming the slit 12c in the transparent conductive part 12 in this manner, compared with a case where the slit 12c is not provided in the transparent conductive part 12, expanding/shrinking force in the entirety of the transparent conductive parts 12 after annealing treatment can be reduced. Accordingly, tensile stress occurring in the resin sheet 11 can be reduced, and the difference in retardation of the resin sheet 11 can be suppressed to not greater than 3 nm.

4. Fourth Embodiment

Figure 10:
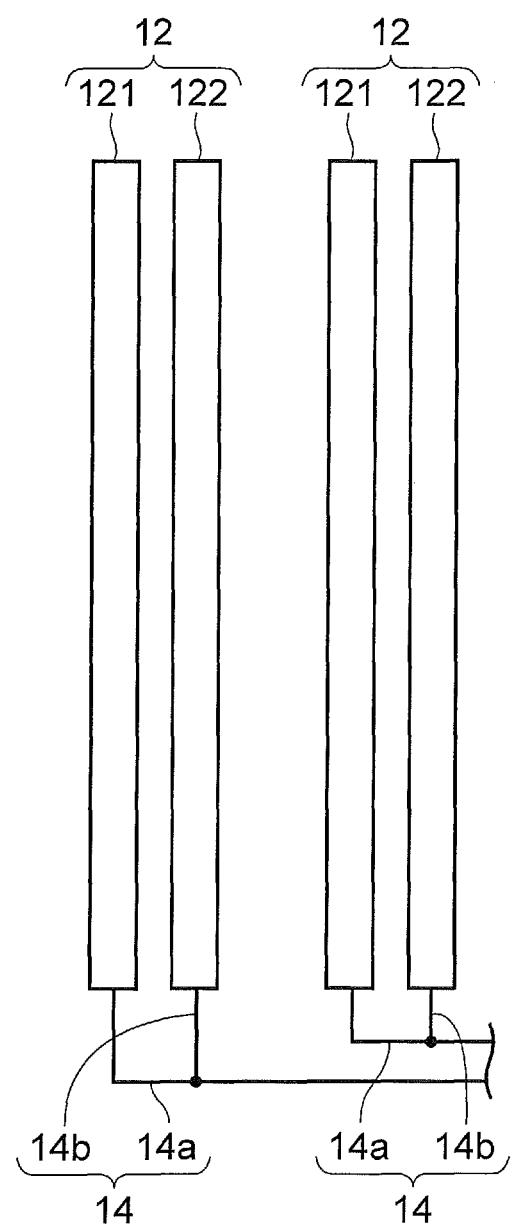
FIG. 10 is a top view showing a structure of the transparent conductive part according to a fourth embodiment.

FIG. 10 shows a structure of the transparent conductive part 12 according to the present embodiment.

In the present embodiment, as shown in FIG. 10, one transparent conductive part 12 is composed of two conductive parts 121 and 122 each having a narrow shape. Each lead electrode 14 is composed of a lead electrode 14a connected to a conductive part 121 and a lead electrode 14b connected to a conductive part 122.

By forming the transparent conductive part 12 divided into the two narrow-shaped conductive parts 121 and 122, expanding/shrinking force in the entirety of the transparent conductive parts 12 after annealing treatment can be reduced. Accordingly, tensile stress occurring in the resin sheet 11 can be reduced, and the difference in retardation of the resin sheet 11 can be suppressed to not greater than 3 nm.

5. Fifth Embodiment

Figure 11:
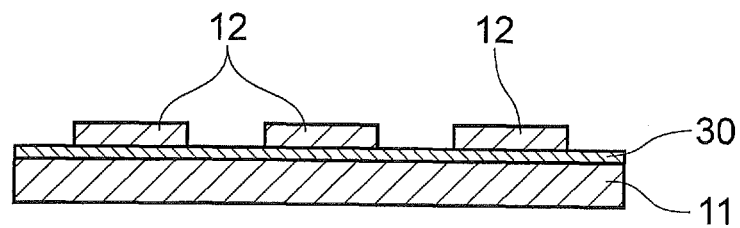
FIG. 11 is a cross-sectional view showing an example in which a stress relaxation layer is provided between the resin sheet and the transparent conductive parts.

FIG. 11 is a cross-sectional view showing an example in which a stress relaxation layer 30 is provided between the resin sheet 11 and the transparent conductive parts 12.

As shown in FIG. 11, the stress relaxation layer 30 may be formed between the resin sheet 11 and the transparent conductive parts 12. The stress relaxation layer 30 can be formed from, for example, a titanium oxide thin film (thickness: about 20 nm to 1 μm).

By forming the stress relaxation layer 30 in this manner, stress applied on the resin sheet 11 due to expansion/shrinkage of the transparent conductive parts 12 can be relaxed by the stress relaxation layer 30. As a result, the difference in retardation of the resin sheet 11 can be suppressed to not greater than 3 nm.

6. Sixth Embodiment

Figure 12:
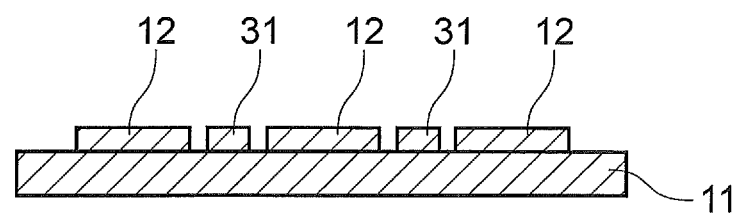
FIG. 12 is a cross-sectional view showing an example in which a stress relaxation part is provided between its adjacent transparent conductive parts.
Figure 13:
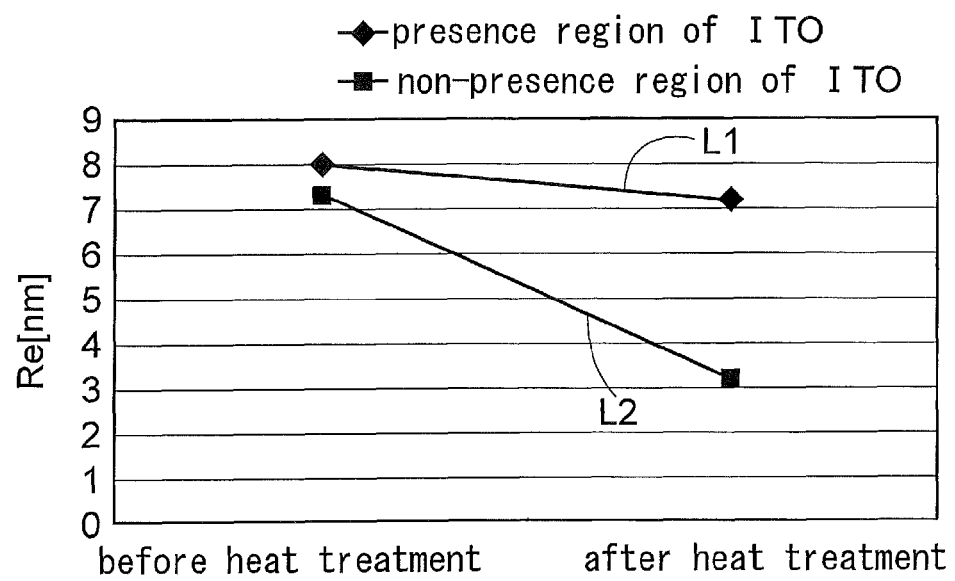
FIG. 13 is a graph showing change in retardation before and after annealing treatment according to conventional art.

FIG. 12 is a cross-sectional view showing an example in which a stress relaxation part 31 is provided between its adjacent transparent conductive parts 12.

As shown in FIG. 12, the stress relaxation part 31 may be formed in each non-presence region of the transparent conductive part 12 on the resin sheet 11, the stress relaxation part 31 being formed from a material different from that of the transparent conductive part 12. The stress relaxation part 31 can be formed from a material identical to that of the resin sheet 11, for example.

By forming the stress relaxation part 31 in this manner, stress applied to the resin sheet 11 due to expansion/shrinkage of the transparent conductive parts 12 can be expected to be relaxed by the stress relaxation parts 31.

It is understood that the present invention is not limited to the above embodiments. It is obviously possible to practice the present invention with appropriate modifications as long as they conform to the effect of the present invention, and such modifications are included in the technological scope of the present invention.

The present application claims for benefit of priority based on Japanese Patent Application No. 2011-206417 filed on Sep. 21, 2011. The entirety of the specification of Japanese Patent Application No. 2011-206417 filed on Sep. 21, 2011 is incorporated herein for reference.

INDUSTRIAL APPLICABILITY

The present invention can be employed for suppressing recognition of transparent conductive parts in a capacitance type touch sensor or the like.

DESCRIPTION OF THE REFERENCE CHARACTERS 11, 11a, 11b resin sheet
12, 13 transparent conductive part
12a, 12b, 12c slit
30 stress relaxation layer
31 stress relaxation part
50, 50a, 50c sensor sheet
100 capacitance type touch sensor
200 display device

The invention claimed is:

1. A capacitance type touch sensor including a resin sheet and a plurality of transparent conductive parts formed in parallel to each other on the resin sheet, wherein
a difference between a maximum value and a minimum value of a retardation value of the resin sheet including the transparent conductive parts is not greater than 3 nm, and
each transparent conductive part is formed by an evaporation method, a sputtering method, an ion plating method, or a plating method, and a value of a thickness of the transparent conductive part/a thickness of the resin sheet is not less than 0.000016 and not greater than 0.02.

2. The capacitance type touch sensor according to claim 1, wherein
a stress relaxation layer is formed between the resin sheet and each transparent conductive part.

3. The capacitance type touch sensor according to claim 1, wherein
a slit is formed in a portion of each transparent conductive part.

4. The capacitance type touch sensor according to claim 1, wherein
the resin sheet has a photoelastic coefficient of not greater than $30 \times 10^{-8}$ cm$^2$/N.

5. The capacitance type touch sensor according to claim 1, wherein
a stress relaxation part is formed in a non-presence region of the transparent conductive part on the resin sheet, the stress relaxation part being formed from a material different from a material of the transparent conductive part.

6. A display device having a display panel to which the capacitance type touch sensor according to claim 1 is mounted.

7. A capacitance type touch sensor including a resin sheet and a plurality of transparent conductive parts formed in parallel to each other on the resin sheet, wherein
a difference between a maximum value and a minimum value of a retardation value of the resin sheet including the transparent conductive parts is not greater than 3 nm, and
each transparent conductive part is formed from a dried coating film, and a value of a thickness of the transparent conductive part/a thickness of the resin sheet is less than 5.

8. A display device having a display panel to which the capacitance type touch sensor according to claim 7 is mounted.

9. The capacitance type touch sensor according to claim 7, wherein
a stress relaxation layer is formed between the resin sheet and each transparent conductive part.

10. The capacitance type touch sensor according to claim 7, wherein
a slit is formed in a portion of each transparent conductive part.

11. The capacitance type touch sensor according to claim 7, wherein
the resin sheet has a photoelastic coefficient of not greater than $30 \times 10^{-8}$ cm$^2$/N.

12. The capacitance type touch sensor according to claim 7, wherein
a stress relaxation part is formed in a non-presence region of the transparent conductive part on the resin sheet, the stress relaxation part being formed from a material different from a material of the transparent conductive part.

13. A capacitance type touch sensor including a resin sheet and a plurality of transparent conductive parts formed in parallel to each other on the resin sheet, wherein
a difference between a maximum value and a minimum value of a retardation value of the resin sheet including the transparent conductive parts is not greater than 3 nm, and
the transparent conductive parts are formed in a stripe shape on at least one face of the resin sheet, and a value of a width of a non-presence region of the transparent conductive part/a width of a presence region of the transparent conductive part on the one face is not less than 3 and not greater than 10.

14. A display device having a display panel to which the capacitance type touch sensor according to claim 13 is mounted.

15. The capacitance type touch sensor according to claim 13, wherein
a stress relaxation layer is formed between the resin sheet and each transparent conductive part.

16. The capacitance type touch sensor according to claim 13, wherein
a slit is formed in a portion of each transparent conductive part.

17. The capacitance type touch sensor according to claim 13, wherein
the resin sheet has a photoelastic coefficient of not greater than $30 \times 10^{-8}$ cm$^2$/N.

18. The capacitance type touch sensor according to claim 13, wherein
a stress relaxation part is formed in a non-presence region of the transparent conductive part on the resin sheet, the stress relaxation part being formed from a material different from a material of the transparent conductive part.

* * * * *